Nov. 30, 1971　　　　　B. VOUMARD　　　　　3,623,274
INTERNAL GRINDER

Filed Aug. 5, 1969　　　　　　　　　　　4 Sheets-Sheet 1

INVENTOR
BERTRAND VOUMARD
BY Beveridge & DeGrandi
ATTORNEYS

Nov. 30, 1971  B. VOUMARD  3,623,274
INTERNAL GRINDER
Filed Aug. 5, 1969  4 Sheets-Sheet 2
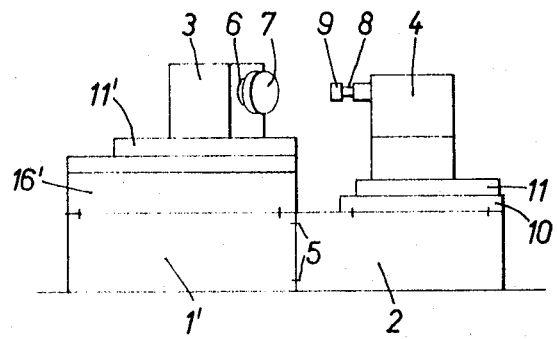
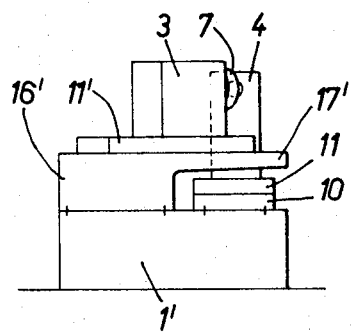
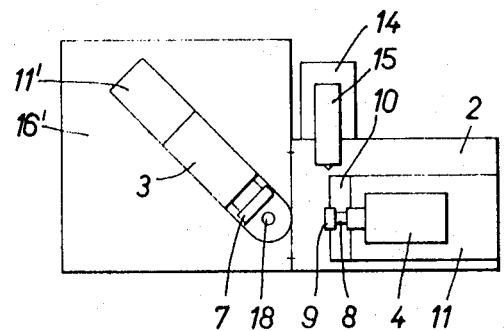
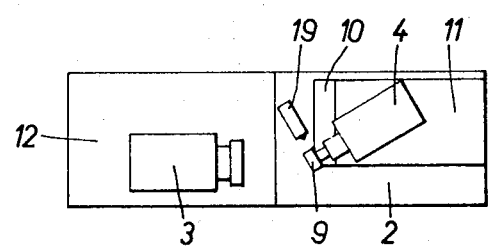
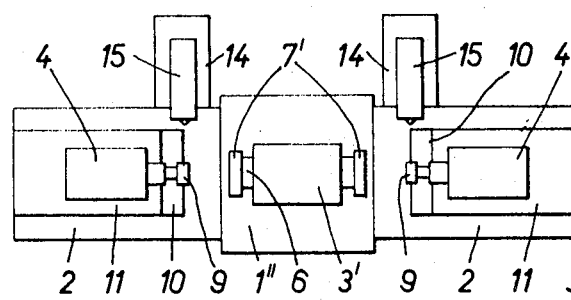
INVENTOR
BERTRAND VOUMARD
BY
Beveridge & DeGrandi
ATTORNEYS

United States Patent Office 3,623,274
Patented Nov. 30, 1971

3,623,274
INTERNAL GRINDER
Bertrand Voumard, Neuchatel, Switzerland, assignor to Voumard Machines Co. S.A., Neuchatel, Switzerland
Filed Aug. 5, 1969, Ser. No. 847,658
Claims priority, application Switzerland, Aug. 14, 1968, 12,209/68
Int. Cl. B24b *41/02*
U.S. Cl. 51—166 FB                8 Claims

ABSTRACT OF THE DISCLOSURE

The internal grinder is composed of independent units consisting of base parts, one or more headstock spindle units, one or more grinding spindle units, and with or without a loading and unloading unit, all of which units can be put together in various combinations to construct high-precision internal grinders specifically adapted to certain kinds of operations.

BACKGROUND OF THE INVENTION

The invention relates to an internal grinder having headstock and grinding spindle arrangements supported by a base.

Up to the present time, internal grinders consist of a base to which are anchored the table and the grinding and headstock spindle arrangements built up on the table. The guideways for the table form a whole with the base. To grind a large number of this or that kind of workpiece, it has hitherto been customary each time to build an internal grinder suitable only for the task at hand. Herewith, there has been sought the best solution to the problem of constructing internal grinders that meet the most exacting demands. The resulting internal grinders have been very different from one another, depending on the kind of workpieces they were to grind. These grinders have the great disadvantage that they are not easily redesigned for the grinding of other kinds of workpieces, once they are no longer needed to grind the workpieces for which they were specifically intended.

SUMMARY OF THE INVENTION

An object of the invention is to provide an internal grinder that is economically constructed suitable for grinding specific workpieces, and that can be inexpensively redesigned when necessary to grind workpieces of other shapes without at all impairing the accuracy of the grinder.

Another object of the invention is to shorten considerably the manufacturing time of grinders of the preceding object.

These and other objects will be apparent from the following description of the invention.

BRIEF DESCRIPTION OF THE DRAWINGS

The invention will be described, with reference to the figures of the accompanying drawings, wherein:

FIGS. 6 to 16 show various way in which the internal grinder of the invention can be constructed for grinding different kinds of workpieces.

FIGS. 6 to 8 are respectively side, left end, and top views of one possibility;

FIGS. 9 to 12 are each top views of four additional possibilities;

FIG. 13 is a right-end view of the headstock spindle arrangement and associated units on the base part 1', shown in FIG. 12; and FIGS. 14 to 16 are top view of three further possibilities.

DESCRIPTION OF THE PREFERRED EMBODIMENTS

In the manufacture of high-precision grinders, especially suited to the exact grinding of particular workpieces having only slight errors in dimension and in geometrical form, even the construction of the base frame was, in each case, completely adapted to the special purpose of the grinder. Whenever even only a few grinders were to be constructed for some special purpose, it was consequently necessary to prepare completely new drawings and molds from the base up. Specialists were of the opinion that the desired objective—the greatest possible precision—could be obtained only if the heads for the workpieces and the grinding wheels are supported by a single, unitary base frame. Tests have demonstrated, however, that this view is not justified.

Figure 1:
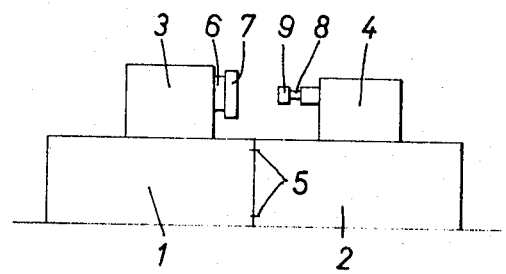
FIG. 1 is a schematic side view of a simple interal grinder of the invention.

FIG. 1 is a schematic representation of an internal grinder having a base composed of two units 1 and 2. A headstock spindle arrangement 3 and a grinding spindle arrangement 4 are respectively mounted on the base parts 1 and 2. Connecting members 5 (not shown in detail) are equidistantly spaced along the sides of the base units, enabling the latter to be placed together in many different ways and to be rigidly connected together.

Arranged on the end of the headstock spindle 6 projecting from the arrangement 3 is a workhead 7 for the workpieces, not shown. The headstock spindle is so carried in bearings that it cannot be moved axially. On the other hand, the grinding spindle 8, provided with a grinding wheel 9, has a limited freedom to move axially with respect to the grinding spindle arrangement 4. This restricted axial movement and the simple arrangement of the parts 3 and 4 in FIG. 1 are sufficient for the grinding of simple workpieces.

Figure 2:
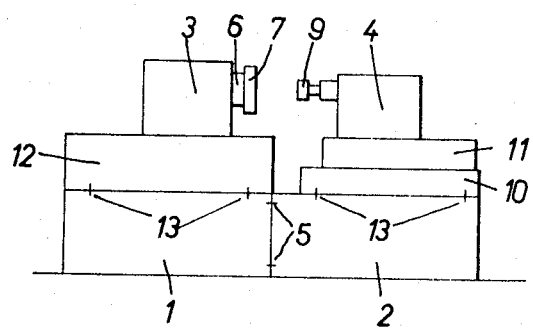
FIG. 2 is a side view of an internal grinder with intermediate members.

If the limited axial movement of the grinding spindle is too short to grind other workpieces, the headstock and grinding spindle arrangements 3 and 4 are not set directly on the base units 1 and 2. Provided between the grinding spindle arrangement 4 and the base unit 2 is an intermediate member 10 for guiding the table 11, to which the arrangement 4 is attached to lengthen the travel, as shown in FIG. 2. The spindle heights are equalized by a single intermediate member 12 placed between the headstock spindle arrangment 3 and the base unit 1. Uniformly arranged connecting members 13, shown schematically, rigidly connect the intermediate members 10 and 12 to the base units 1 and 2.

Figure 3:
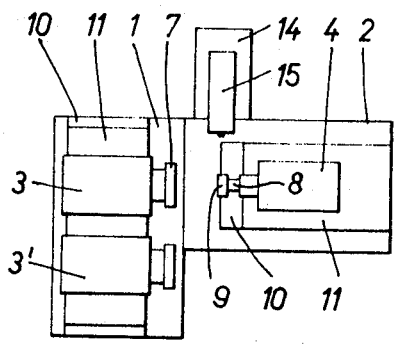
FIG. 3 is a top view of an internal grinder with two table units and two headstock spindle arrangements.

FIG. 3 is a top view of a third embodiment of the internal grinder of the invention. The base units 1 and 2 are positioned at an angle to each other. To each base unit is fixed an intermediate member 10 for guiding the table 11. The grinding spindle 8 can be moved axially with respect to the workpieces held in the workhead 7. Two headstock spindle arrangments 3 and 3' are movably arranged transversely to the grinding spindle axis, on the member 10 fixed to the base unit 1. This embodiment permits a finished workpiece in one workhead 7 to be replaced by an unfinished workpiece while the workpiece of the other workhead is being ground. An auxiliary carrier 14 for supporting a wheel dresser 15 for the grinding wheel 9 is fixed to one side of the base unit 2.

Figure 4:
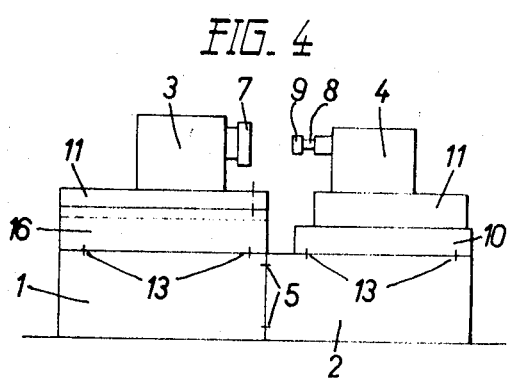
FIG. 4 is a side view of an internal grinder having intermediate members and a bridge-like projection.
Figure 5:
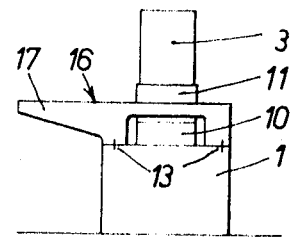
FIG. 5 is a view of the left end of the grinder as seen in FIG; 4.

A still further embodiment is shown in FIGS. 4 and 5. The arrangement of the grinding spindle arrangement 4 on the base unit 2 is similar to that shown in FIGS. 2 and 3. The intermediate member 16 between the headstock spindle arrangment 3 and the base unit 1 comprises a "bridge," or projection 17 that extends beyond the base part 1 to enlarge the supporting area of the member 16. This member is constructed as a kind of cantilever bridge, under which other parts can be pushed.

FIGS. 6 to 8 are respectively side, end, and top views of a further embodiment. The base unit 1' is square in top view. The arrangement of the grinding spindle arrangement 4 on the base unit 2 is similar to that of the embodiments shown in FIGS. 2 to 5. The intermediate member 16' also incorporates a projection 17'. Underneath this projection is provided a cavity into which other parts of the grinder can extend. The guide 11' is arranged on the intermediate member 16' free to pivot about the center 18, enabling the axis of the headstock spindle arrangement 3 to be set diagonally with respect to the grinding spindle arrangement 4. The headstock spindle arrangement 3 is arranged free to move axially on the guide 11'. This embodiment permits conical surfaces to be ground on workpieces. FIG. 8 shows an auxiliary carrier 14 and its wheel dresser 15, these two parts not being shown in FIGS. 6 and 7 to preserve their simplicity.

FIG. 9 is a top view of another embodiment. On the invisible base part 1 rests a single intermediate member 12 carrying a headstock spindle arrangement 3. The grinding spindle arrangment 4 is mounted free to pivot on the guide 11, so that this embodiment also enables the grinding of conical internal surfaces. A truing attachment, particularly intended for dressing the diagonally set wheel 9, is arranged on the base unit 2.

FIG. 10 is a top view of a further embodiment. A respective base unit 2, each carrying a grinding spindle arrangement 4, is fixed to either side of a base unit 1''. This embodiment incorporates a headstock spindle arrangement 3' having a workhead 7' at either end of the headstock spindle 6. The embodiment permits two workpieces to be ground at the same time, using only one headstock spindle and one motor for driving this spindle. An auxiliary carrier 14 is provided on each base unit 2. Fixed to each carrier is a wheel dresser 15 for the grinding spindle arrangements 4.

Figure 11:
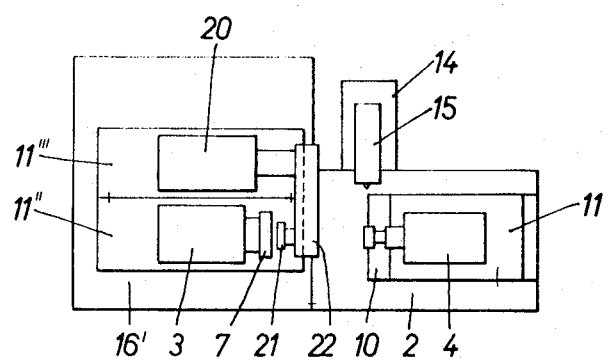

FIG. 11 shows another embodiment of which the base units 1' (not visible) and 2 are fixed together. A grinding spindle arrangement 4, having a guide 11 and an intermediate member 10, is arranged on the base unit 2. The auxiliary carrier 14 with its dresser 15 is fixed to one side of the base 2. A face grinder 20, resting on a guide 11''', is located next to the heeadstock spindle arrangement 3, which the guide 11'' connects to the intermediate member 16'. The grinder 20 has a face grinding wheel 21 connected by a pivotal arm 22 to the drive of the grinder 20. This arrangement permits grinding of the end face of the workpiece.

Figure 12:
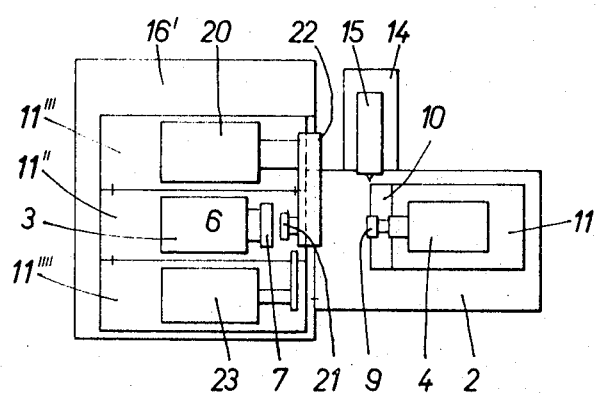
Figure 13:
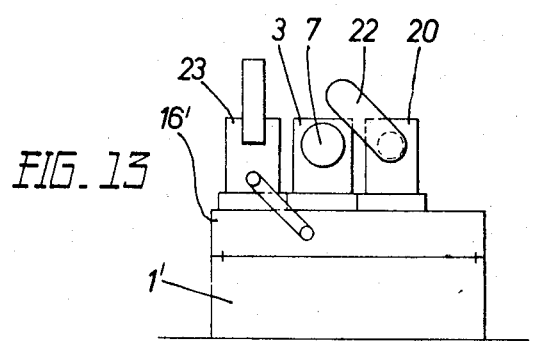

FIG. 12 is a top view of another embodiment. It differs from the embodiment shown in FIG. 11 only in having a loading and unloading unit 23. This unit is arranged on a guide 11'''' and serves to feed workpieces automatically to the workhead 7 and to remove the finished piece automatically from the workhead. FIG. 13 shows schematically the arrangement of the headstock spindle arrangement 3, the face grinder 20, and the loading and unloading unit 23, as seen from the front. In FIG. 13, both the grinding spindle 4 and the auxiliary carrier 14 are omitted.

Figure 14:
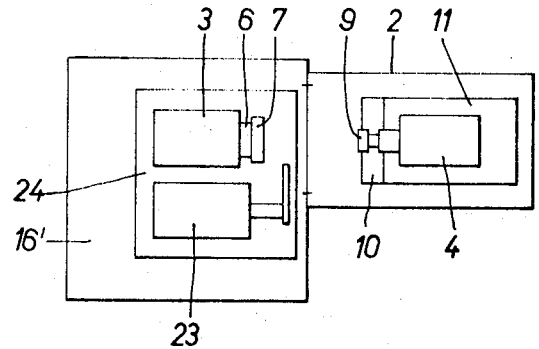

The top view of another embodiment is shown in FIG. 14, the invisible base unit 1 supporting an intermediate member 16', which carries a common guide 24 for the headstock spindle arrangement 3 and the loading and unloading unit 23.

Figure 15:
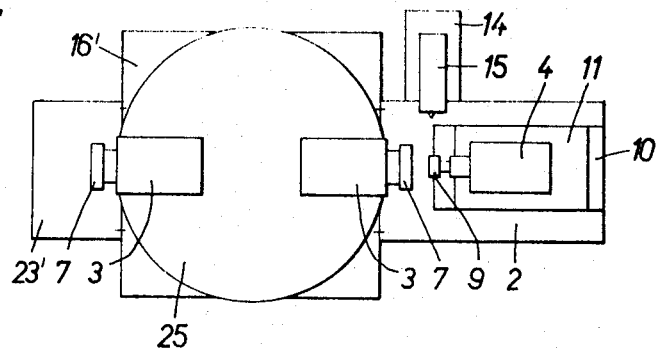

FIG. 15 is a top view of a still further embodiment. The invisible base unit 1', which is square in plan view, supports the intermediate member 16' carrying a round, rotatable guide table 25 for mounting several headstock spindle arrangements 3. Arranged on the right side is the base unit 2 with its grinding spindle arrangement 4. A loading and unloading unit 23' is provided on the opposite side. This unit feeds to one of the workheads 7 unfinished workpieces that are then ground by the wheel 9 after the guide table 25 has been rotated through 180°. After the grinding operation is finished, the table 25 is again rotated 180° to permit the unit 23' to extract the finished workpiece from the workhead 7.

Figure 16:
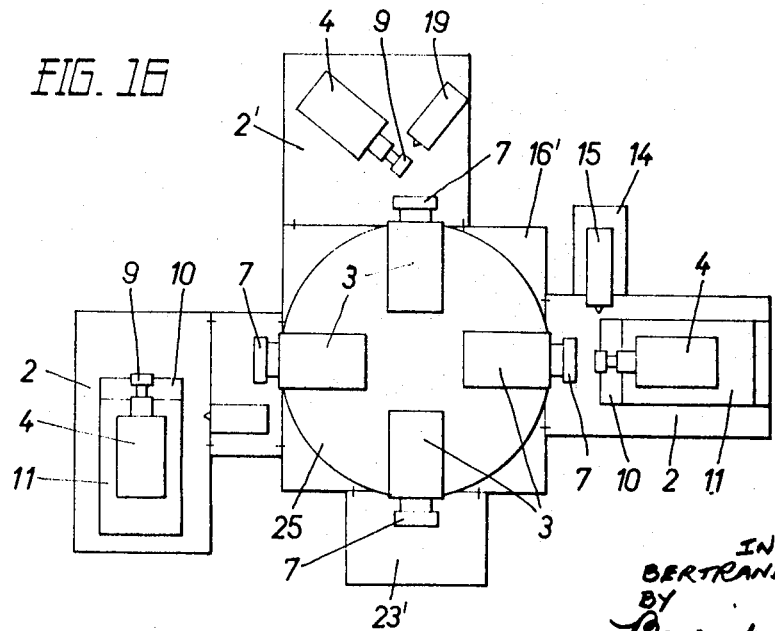

The top view of a further embodiment is shown in FIG. 16, which clearly illustrates a particularly versatile form of the invention, in which various stations, surrounding the intermediate member 16' on three sides, carry out different grinding operations on workpieces that are fed to the workheads 7 by the loading and unloading unit 23' and moved successfully to each station by turning the table 25.

In another embodiment, the one or more headstock spindle arrangements and/or the loading and unloading unit is/are mounted directly on a base unit.

The described embodiments show that it is possible, from base units and other independent units, to construct internal grinders specifically suited to carry out certain grinding steps and yet capable of the highest possible precision, although the cost of manufacturing these grinders is substantially reduced. The standardized base units can be manufactured in quantity, which is more economical, and kept in stock, appreciably reducing the manufacturing time for a grinder of this kind. Moreover, by adding or removing base units and other units, existing internal grinders of the invention can always be easily changed to enable the manufacture of other workpieces.

The base units 1, 2, etc., of the different embodiments house at the most only a part of the assembly for powering the grinder.

Although the preferred embodiments of the invention have been described, the scope of, and the breadth of protection afforded to, the invention are limited solely by the appended claims.

I claim:

1. In an internal grinding machine including a base, and at least one headstock spindle arrangement and at least one grinding spindle arrangement supported on said base, the improvement wherein said base is variable in size and configuration, and comprises a plurality of interchangeable assembly units, and releasable connector means rigidly connecting said assembly units, said base being variable by varying the number and orientation of said interchangeable assembly units connected by said connector means, whereby said base is readily adaptable to support said headstock spindle arrangement and said grinding spindle arrangement for performing various grinding operations.

2. The internal grinding machine as defined in claim 1 wherein said base comprises at least a pair of base assembly units supported in side-by-side relation and rigidly connected by said connector means, and at least one intermediate assembly unit supported on and rigidly connected to said base assembly units.

3. The internal grinding machine defined in claim 2 wherein said base comprises a pair of said intermediate assembly units, said headstock spindle arrangement and said grinding spindle arrangements being supported on said intermediate assembly units.

4. The internal grinder as defined in claim 3, including at least one table movably mounted on at least one of said intermediate units, at least one bridge movably arranged on at least one of said base units, and wherein at least one of said intermediate members is movable on its said base unit.

5. The internal grinder as defined in claim 3, further comprising a workpiece loading and unloading unit movably mounted on a said intermediate member.

6. The internal grinder as defined in claim 5, wherein said headstock spindle arrangement is movably mounted on its said intermediate member.

7. The internal grinder as defined in claim 1, including a workpiece loading and unloading unit mounted directly on one of said base units.

8. The internal grinder as defined in claim 7, wherein said headstock spindle arrangement is mounted directly on one of said base units.

References Cited

UNITED STATES PATENTS

| | | | |
|---|---|---|---|
| 657,905 | 9/1900 | Lea | 51—166 X |
| 1,102,344 | 7/1914 | Krug | 51—166 |
| 1,338,355 | 4/1920 | Buskard | 51—166 |
| 1,603,692 | 10/1926 | Heald et al. | 51—166 X |
| 2,457,743 | 12/1948 | Stevens | 51—166 X |
| 2,952,949 | 9/1960 | Maker | 51—166 X |

LESTER M. SWINGLE, Primary Examiner